(No Model.) 3 Sheets—Sheet 2.
C. F. BRUSH.
CURRENT GOVERNOR FOR DYNAMO ELECTRIC MACHINES.
No. 260,650. Patented July 4, 1882.
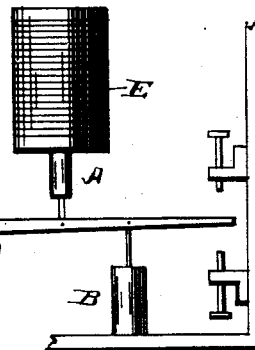
*Fig. 3.*
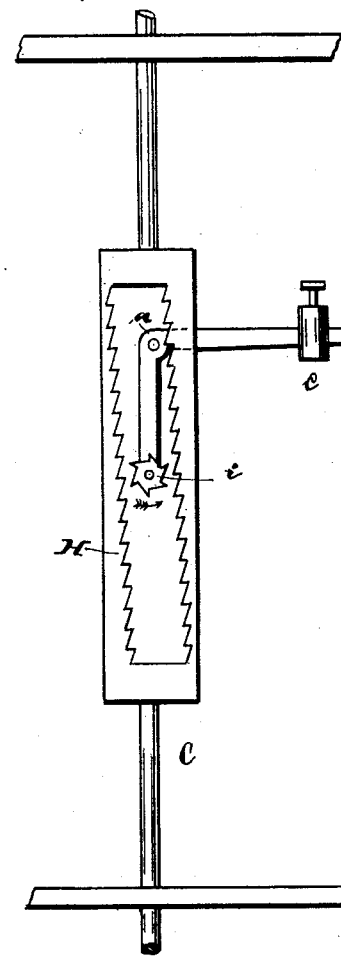
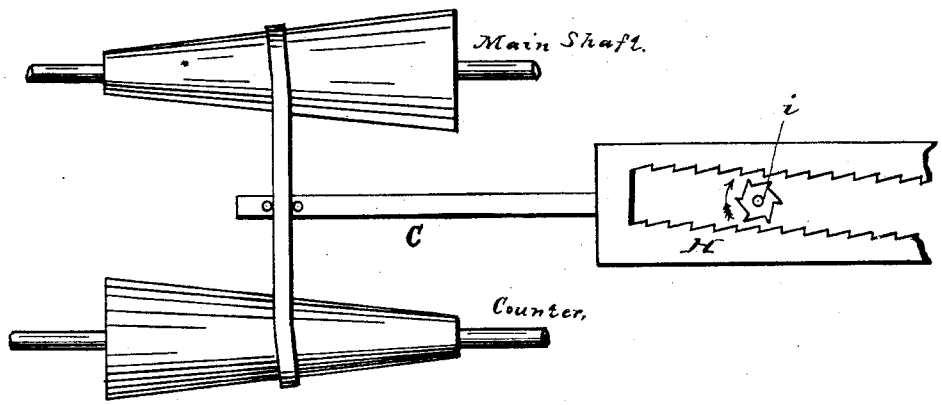
*Fig. 5.*
WITNESSES
F. W. Fabor
A. W. Bright
INVENTOR
Chas. F. Brush.
By Leggett & Leggett
ATTORNEY (No Model.) 3 Sheets—Sheet 3.
C. F. BRUSH.
CURRENT GOVERNOR FOR DYNAMO ELECTRIC MACHINES.
No. 260,650. Patented July 4, 1882.
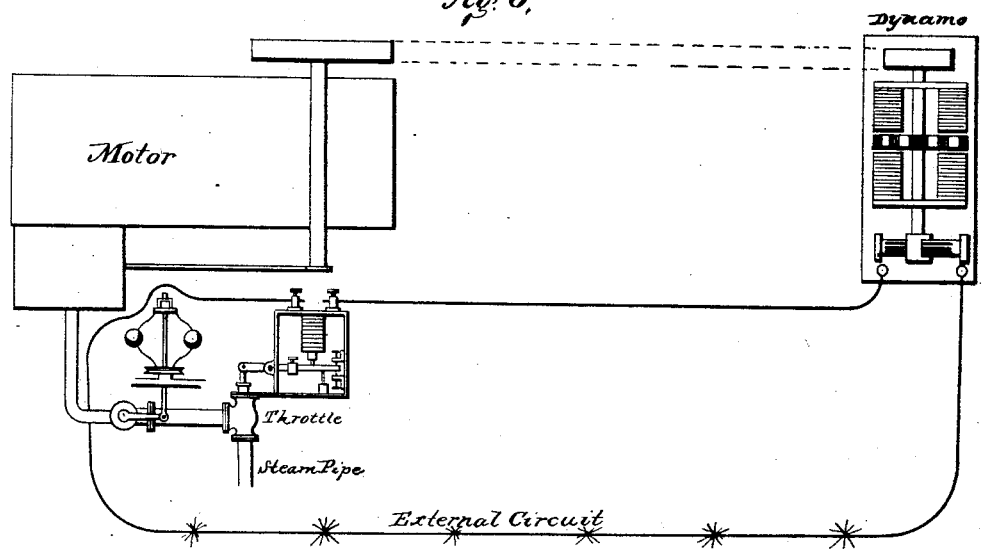

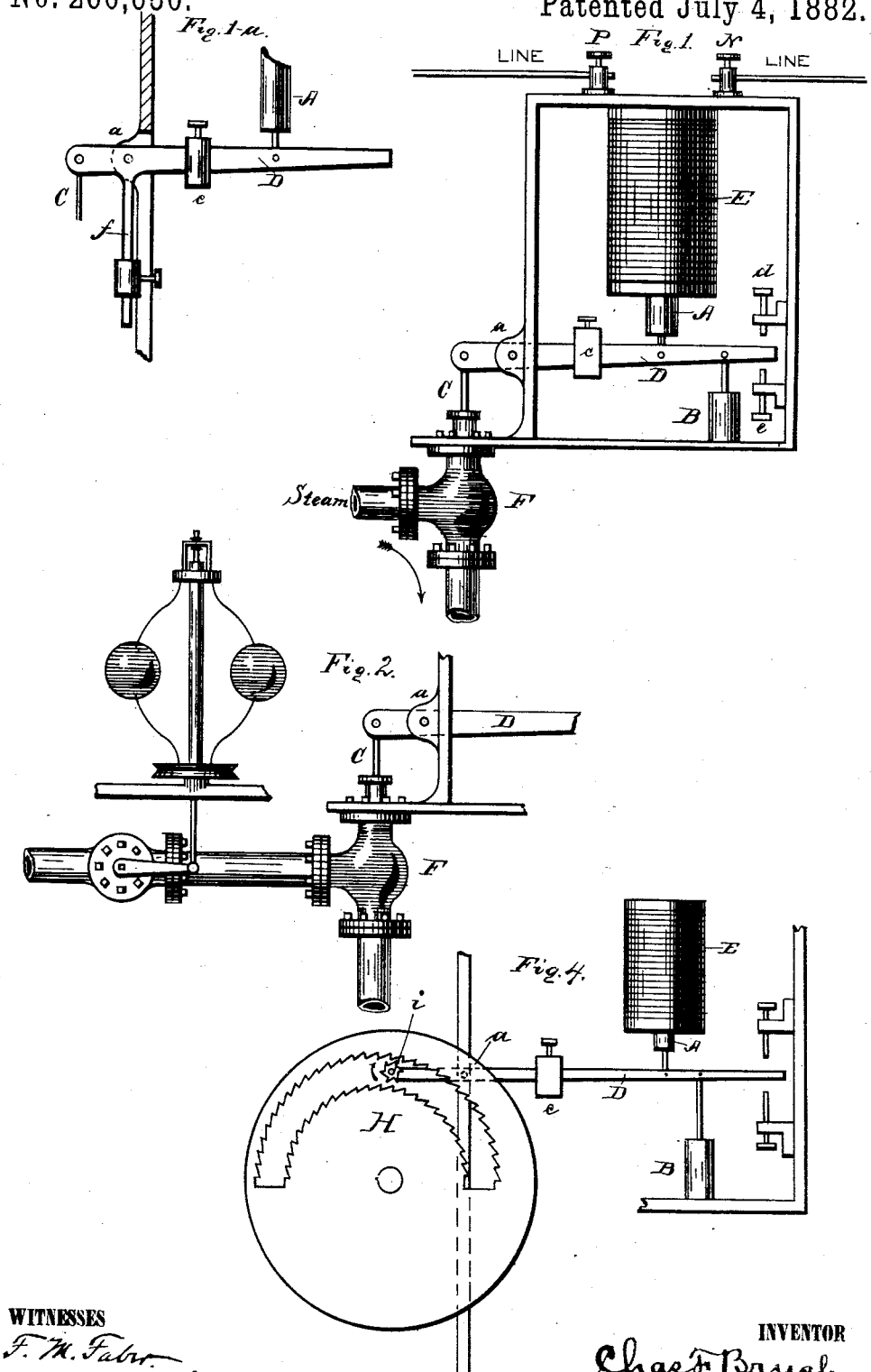

UNITED STATES PATENT OFFICE.

CHARLES F. BRUSH, OF CLEVELAND, OHIO.

CURRENT-GOVERNOR FOR DYNAMO-ELECTRIC MACHINES.

SPECIFICATION forming part of Letters Patent No. 260,650, dated July 4, 1882.

Application filed June 29, 1880. (No model.)

*To all whom it may concern:*

Be it known that I, CHARLES F. BRUSH, of Cleveland, in the county of Cuyahoga and State of Ohio, have invented certain new and useful Improvements in Electrical Governors for Dynamo-Electric Machines; and I do hereby declare the following to be a full, clear, and exact description of the invention, such as will enable others skilled in the art to which it pertains to make and use it, reference being had to the accompanying drawings, which form part of this specification.

My invention relates to dynamo-electric machines, and has for its object the automatic control of the driving-power applied to such apparatus, whereby the speed of armature rotation is regulated in accordance with the requirements of the external circuit, so that a uniform, or nearly uniform, current-strength may be maintained while the circuit-resistance varies.

I accomplish my object by employing a magnetic apparatus actuated by the external current of the machine to regulate the admission of steam or water, as the case may be, to the driving-engine. Increase of current in the circuit acts to diminish the supply of motive agent, and thus to decrease the speed of the dynamo-machine until the normal current volume is restored, while decrease of current produces the contrary effect.

In the drawings, Figure 1 shows my automatic apparatus applied as a governor to a steam-engine. Fig. 2 shows my electrical governor combined with a centrifugal governor. Fig. 3 illustrates a modification of my device adapted to overcome the mechanical resistance of the regulating valves or gates in the cases of large steam-engines and water-wheels. Fig. 4 shows another modification similar to Fig. 3. Fig. 5 illustrates a method of governing the speed of a dynamo-machine while that of the primary driving power remains constant. Fig. 6 illustrates an electric lighting system embodying one form of my improvement.

In Fig. 1, E is a hollow helix, having its terminals connected with the binding-posts P N, and thus with the line or external circuit of the dynamo-electric machine whose speed is to be governed. Within this helix is a movable iron core, A, pivoted to the lever D, as shown. The lever D is pivoted again to the frame of the apparatus at $a$. The lever has also pivoted to it the piston-rod of a dash-pot, B. The piston of this dash-pot may or may not be provided with a valve to free the motion of the lever D in one direction. $c$ is a weight, movable and therefore adjustable on the arm or lever D. $d$ $e$ are screws for adjusting the limits to the movements of the lever D. At the other end of the lever D is pivoted a valve-stem, C, forming part of an ordinary steam-governor valve, F. This valve controls the admission of steam to the engine (not shown) which drives the dynamo-electric machine or machines (not shown) in whose working-circuit the helix E is located.

In practical operation the weight $c$ is so adjusted that when the normal electric current circulates in the helix E the attraction of the latter for its core A shall be just sufficient to sustain the core, together with the movable parts attached thereto. If, now, the valve-stem C is not in the right position—is raised too high, for instance—too much steam will be admitted to the engine through the valve F, and the engine and dynamo-machine attached will have their speed of rotation increased. This will augment the current in the helix E, drawing upward the core A and depressing the valve-stem C until the speed of the engine is properly reduced. If the line-resistance is reduced from any cause, the increase of current thereby produced in the circuit, including the helix E, will act as before, further throttling the steam at the governor-valve F, and thus reduce the speed of the engine and dynamo-machine until the current in the circuit is nearly or quite reduced to its normal strength. If, on the other hand, the circuit-resistance is increased by inserting more electric lights or otherwise, the weakening of the current thereby occasioned allows the helix E to drop its core A and raise the valve-stem C, thus admitting more steam to the engine, which accordingly increases its speed until the normal current strength in the circuit is restored.

The office of the dash-pot B is to prevent the too sudden opening or closing of the valve F. Two helices, E, with corresponding cores A united in the customary manner, may be employed instead of the single one shown.

Any suitable form of throttle-valve may be employed at F, and, if desirable, the valve may be so constructed that the upward motion of the stem C shall operate to close it, thus allowing of a change of position in the fulcrum of the lever D.

Instead of utilizing the motion of the stem C to throttle the steam admitted to the engine to be controlled, it may be employed to regulate the point of "cut-off" of the steam in the cylinder by any of the methods customary with engines of the "automatic cut-off" class. This of course is the more desirable manner of applying my invention, especially in the case of large engines, since the same economy of steam will be effected that obtains when the engines are governed by centrifugal action in the ordinary manner.

I have illustrated my invention applied as a throttling-governor instead of as a cut-off governor for the sake of simplicity merely, and do not in any manner limit myself to the particular form or application shown.

In the construction of my apparatus it will of course be necessary to so arrange or shape the helix E and core A that the latter shall not be attracted with increasing force as it moves upward through the distance allowed it, since a neglect of this precaution would evidently leave the apparatus in a state of unstable equilibrium. On the contrary, it is advisable to so arrange matters that the attraction of the helix for its core shall diminish slightly as the latter ascends. The same ultimate result may be obtained by attaching a suitably-weighted pendulum-lever to the arm D at its fulcrum, as shown in Fig. 1$^a$. Here, as the core A rises, the pendulum $f$ is thrown out of the vertical position, and more or less of its weight is added to that of the lever D, according to the position of the core A, so that the latter will have a constantly-increasing load to carry as it ascends.

In order to prevent the engine "racing" when the working-circuit of the dynamo machine or machines which it is driving becomes of abnormally-high resistance or is broken, an ordinary centrifugal governor may be employed in combination with my electrical governor, as shown in Fig. 2. Here the centrifugal governor is so adjusted that it does not begin to control the flow of steam until the engine has passed beyond its normal maximum rate of speed. Thus when conditions arise, accidentally or otherwise, under which the electrical governor cannot properly perform its function this auxiliary centrifugal governor comes into action.

I have thus far described my apparatus as applied to the automatic control of the speed of dynamo-electric machines driven by steam-power only, but that it is equally applicable when water-power is employed must be obvious. In the case of water-power, the available mechanical force of the helix E and its core will not be sufficient to operate the gate controlling the flow of water, and some auxiliary mechanism furnishing the required mechanical power, but controlled by the electrical apparatus, must be employed. This auxiliary mechanism I do not here claim as my invention; but I shall show and describe the same for the purpose, merely, of setting forth one or two of various methods whereby the axial magnet of my governor can be employed to control a water-gate or belt-shifting apparatus. In omitting, however, any attempt herein to claim said auxiliary mechanism, I do not waive the right in any future application to more particularly show, specify, and claim this auxiliary mechanism, if I so elect, inasmuch as it is here introduced for the sake of convenience in setting forth the full application of my invention, hereinabove specified. Fig. 3 shows one convenient form of such mechanism. Here the valve or gate stem C is made of suitable size and strength, and, instead of being attached directly to the arm D, is attached to a frame, H. The sides of this frame form two toothed racks parallel with each other, but not so with the line of motion of the frame. The lever D carries at its working end a ratchet-wheel, $i$, of such size that it can just revolve between the racks forming the sides of the frame H without engaging with either. This ratchet-wheel is attached to the end of a jointed or flexible shaft or spindle (not shown) passing through the arm D. By means of its flexible shaft the wheel $i$ is connected with the motive power which is to be governed, or with other motive power from which it receives a slow rotary motion in the direction indicated by the arrow, while at the same time it is free to be carried to the right or left by the lever D. Now, when the core A rises the ratchet-wheel $i$ engages with the right-hand rack of the frame H, and the latter, together with the stem C, is carried upward until the rack, owing to its oblique motion, ceases to engage the ratchet-wheel $i$. When the core A falls the wheel engages with the other rack and the stem C is depressed. Thus the stem C is caused to rise and fall (much or little) with the core A, and may overcome great mechanical resistance without taxing the magnetic part of the apparatus. By inclining the racks H in the other direction and reversing the motion of the wheel $i$ the stem C will be caused to move upward when the core A moves downward, and the contrary. This auxiliary mechanism may also be employed to work the governing-valves or cut-off mechanism of large steam-engines where the friction of parts is considerable.

In the case of water-wheels, as with steam-engines, it is always advisable to employ an auxiliary governor, as and for the purpose already specified in connection with the steam apparatus.

Fig. 4 shows a modification of the device shown in Fig. 3, wherein the frame H is curved, so that angular or rotary motion is produced instead of rectilinear motion.

Other auxiliary governing apparatus controlled by the helix E and core A, Fig. 3, may be employed, either of electrical or of purely mechanical nature; but, as I have sufficiently indicated the principle involved, I will not describe further modifications.

The application of my invention to gas and other heat engines, wind-wheels, &c., when employed to drive dynamo-electric machines is too obvious to require explanation.

The mechanism shown in Fig. 3, or its equivalent, may further be employed to control and vary the speed of dynamo-electric machines while the speed of the primary driving power remains constant. One method of accomplishing this result is illustrated in Fig. 5. Here power is transmitted from the main shaft to the counter-shaft by means of a belt traveling on oppositely-coned pulleys, as shown. The belt is shifted, as required, by means of the stem or rod C, actuated in the manner already specified in connection with Fig. 3, so that while the speed of the main shaft remains constant that of the counter-shaft and dynamo-machine driven therefrom may be suitably varied and controlled.

I have described the helix E as being located in and operated by the main or working current of the dynamo-machine whose speed is to be governed; but it may evidently be located in a shunt or derived circuit wherein the current strength is dependent on that in the working-circuit. Such a modification obviously does not affect the principles involved in my invention.

When the helix E and core A are replaced by an ordinary electro-magnet with fixed core and movable armature it is difficult to obtain sufficient movement of the latter with uniformity of action to effect the object in view. Therefore the magnet E of my governor is of the type termed "axial"—that is, one having a hollow helix inclosing a loosely-fitting core that is drawn within the helix with a force proportionate to the strength of current traversing said helix. The employment of this axial type of magnet in an electrical governor, as herein specified, I believe to be entirely novel with this my invention, and by its use many essential advantages and functions are secured.

I am aware that effort has heretofore been made to produce a governor that would, through the influence of the electric current generated by a dynamo-electric machine, operate to determine and control the speed at which said dynamo-electric machine is driven. Nothing, however, up to the present time has been produced that has ever been susceptible of any practical application, inasmuch as the complexity of mechanism employed and the erroneous principles and ideas proceeded upon have defeated the object sought.

What I claim is—

1. In a system for generating and applying an electric current, the combination of the following-named instrumentalities, to wit: A dynamo-electric machine, a motor for driving said dynamo-electric machine, an external or working circuit upon which is placed one or more electric lamps, electro-motors, or any device to be operated upon or actuated by the electric current, and a governor consisting of a hollow or axial magnet that is energized by current from said dynamo-electric machine, and that is associated with suitable valve or cut-off mechanism, said governor constructed and adjusted to control the speed at which the dynamo-electric machine is driven according to the varying condition of the current in said external or working circuit, substantially as shown.

2. In an electrical governor for regulating the speed at which a dynamo-electric machine is driven, an axial magnet for imparting motion to the moving parts of said governor, said axial magnet being energized by the current of the dynamo-electric machine to be controlled.

3. The combination, with a motor for driving a dynamo electric machine, of a hollow or axial magnet influenced by the current of said dynamo-electric machine and a valve mechanism controlled by said axial magnet to govern the admission of steam, water, or equivalent driving agent to said motor, and thus to govern its speed in accordance with the varying condition of the said current, substantially as shown.

4. The combination, with a motor for driving a dynamo-electric machine, of two governors, one for controlling the speed at which said dynamo-electric machine is driven and answering to the variations in the condition of the external or working circuit, and the other constructed to act only when said speed tends to exceed a given and prescribed maximum.

5. In combination with an electric governor for regulating the speed at which a dynamo-electric machine is driven, the pendent weight $f$, substantially as and for the purpose shown.

In testimony whereof I have signed my name to this specification in the presence of two subscribing witnesses.

CHARLES F. BRUSH.

Witnesses:
LEVERETT L. LEGGETT,
JNO. CROWELL, Jr.